United States Patent [19]
Loomba

[11] 3,794,211
[45] Feb. 26, 1974

[54] CAP ASSEMBLY

[75] Inventor: Yogendra S. Loomba, Roseville, Mich.

[73] Assignee: Allied Chemical Corporation, New York, N.Y.

[22] Filed: June 9, 1971

[21] Appl. No.: 151,401

[52] U.S. Cl..................... 220/89 A, 220/47, 220/51
[51] Int. Cl............................................ B65d 47/36
[58] Field of Search...................... 220/89 A, 47, 51

[56] References Cited
UNITED STATES PATENTS

| 328,008 | 10/1885 | Conner et al. | 220/89 A |
| 2,437,836 | 3/1948 | Santiago | 220/89 A |
| 2,557,120 | 6/1951 | Knoblock | 220/89 A |
| 2,586,858 | 2/1952 | Parsons | 220/89 A |
| 2,712,881 | 7/1955 | Mathisen | 220/89 A |
| 3,567,245 | 3/1971 | Ekstrom | 220/89 A |

Primary Examiner—Samuel B. Rothberg
Attorney—Marvin Bressler and Jonathan Plaut

[57] ABSTRACT

A cap assembly provided with means for attachment to the outlet of a gas storage bottle. The assembly, which totally encloses the outlet of the bottle, is provided with a plurality of equidistantly spaced apertures. In the event that the closed outlet is inadvertently opened, gas is released through the apertures without any thrust development. The cap assembly of the instant invention is particularly designed for use with a gas generator of the type used in inflatable gas bag assemblies.

2 Claims, 2 Drawing Figures

PATENTED FEB 26 1974　　3,794,211
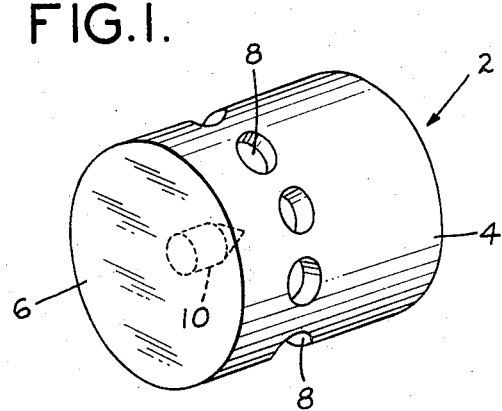
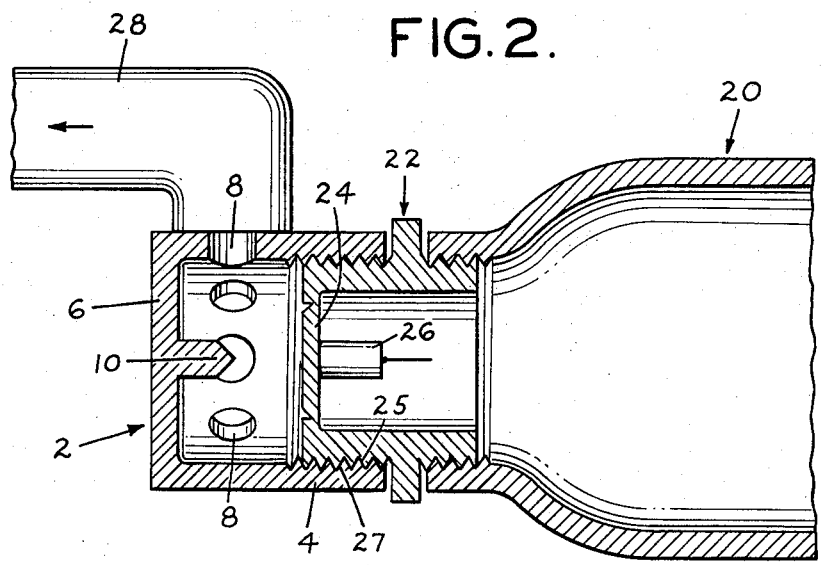
INVENTOR
YOGENDRA S. LOOMBA
BY
Marvin Bressler
ATTORNEY

CAP ASSEMBLY

BACKGROUND OF THE DISCLOSURE

The instant invention is directed to a cap assembly disposed over a pressurized gas storage vessel. More specifically, the instant invention is directed to a safety cap assembly disposed over the closed outlet of a gas storage vessel provided with means to prevent the development of thrust in the event of an inadvertent opening of the vessel. Still more specifically, the instant invention is directed to a safety storage cap assembly, disposed over a gas storage vessel employed as part of an inflatable gas bag assembly, and provided with means to prevent thrust development in the event that the closed outlet is inadvertently opened.

One of the most dramatic developments in the area of road vehicle safety has been the introduction of inflatable gas bag assemblies for passive restraint of road vehicle occupants. This development promises to decrease the number of fatalities and serious injuries resulting from vehicle collisions.

The inflatable gas bag restraint system, of course, has not been free of difficult problems that have had to be solved. One problem, that until now has remained unsolved, has been the safe storage and transportation of the gas generating means used in gas bag assemblies.

As those skilled in the art are aware, inflatable gas bag assemblies may employ three types of gas generating means. The first of these means is a pressurized gas storage vessel, similar to the well known compressed gas bottles used in many applications. Of course, the storage bottles employed in inflatable gas bag assemblies are much smaller in size than the commonly used large gas storage bottles.

A second type of gas generating means employed is a closed vessel filled with a combustible material which upon ignition generates large volumes of pressurized gas. This type of gas generator is known in the art as a "pyrotechnic" gas generator.

A third commonly employed gas generating means is a closed vessel which employs stored pressurized gas as well as a combustible material to generate an additional volume of generated combustion gases. This type of gas generating means is often described as a "hybrid" gas generator.

A problem common to all three types of gas generating vessels is the danger inherent in an inadvertent release of gas while the gas generating means is in storage, in transit or in any other way not installed in the vehicle in which it is to be used.

In the case of a pyrotechnic gas generating means, that is, a gas generating means employing a combustible material to generate combustion product gases, danger lies in an inadvertent ignition of the combustible material. Although, this is a remote possibility, if such an eventuality were to occur the gas generated as a product of combustion would rupture the closed outlet, the weakest point in the generator. The gas would flow out of the bottle, in the same manner as a rocket. The thrust, thus imparted to the metal bottle could cause damage to personnel as well as property.

In the case of a gas generator employing stored gas only, or stored gas in combination with a combustible material, again the weakest point is again the removable outlet disc of the closed gas generator. Thus, an inadvertent release of the stored gas will again usually occur through this point in the vessel. Again, the danger lies in the imparting of a thrust force to the heavy metal gas storage vessel.

In the prior art, no satisfactory apparatus has been developed to prevent the above storage danger.

SUMMARY OF THE INVENTION

The instant invention is directed to a cap assembly disposed about the closed outlet of a gas generating means. It is provided with means to permit release of the gas stored in the gas generating means without the concurrent development of thrust in any direction.

In accordance with the instant invention, a cap assembly is provided for disposition over the outlet of a gas generating means. The assembly is provided with a plurality of apertures spaced equidistantly about a cylindrical member of the cap assembly which envelops the outlet means of the gas generating means. The cap assembly is provided with an outlet plug holding means, attached to the closed end of the cap assembly, to hold the outlet removable disc to insure against blockage of any of the equidistantly spaced apertures.

BRIEF DESCRIPTION OF THE DRAWINGS

The instant invention may be better understood by reference to the accompanying drawings of which:

FIG. 1 is a perspective view of the instant invention; and

FIG. 2 is a sectional elevation view of the instant invention in combination with a gas generating means.

DETAILED DESCRIPTION

Turning now to FIG. 1 in detail, the storage cap assembly of the instant invention is generally indicated at 2. It comprises, in a preferred embodiment, a cylindrically shaped member 4 closed, preferably integrally, at one end by a circularly shaped member 6. The cylindrical member 4 is provided with a plurality of equidistantly positioned apertures 8. In a preferred embodiment, eight apertures are disposed symmetrically around the circumference of the cylindrical member 4. A gas outlet holding means 10 is provided, connected to the closed-end element 6. In a preferred embodiment, the means 10 is integrally formed with the member 6. The gas outlet plug holding means 10, in a preferred embodiment, comprises a pointed element. In a preferred embodiment, all elements of the cap assembly 2 are constructed of steel.

In FIG. 2, the cap assembly of the instant invention is shown disposed about the outlet, generally indicated at 22, of a gas generating means 20. It should be appreciated that the gas generating means 20 may comprise any of the three gas generating means described above. Thus, the gas generating means 20 may comprise a pressurized gas storage vessel, a hybrid gas generating vessel or a pyrotechnic gas generating vessel. The type of gas generating means 20 employed in no way changes the design of the storage cap assembly 2. In FIG. 2 only a portion of the gas generating means is shown. This section, including the outlet, is illustrative of any of the three types of gas generating means described above.

The outlet means 22 of the gas generating means 20 includes a removable plug or disc 24. Depending upon the application, the disc 24 may be ruptured by increasing the pressure inside the generating means 20 or alternatively, as illustrated in FIG. 2, by a detonating means 26 disposed adjacent to the upstream side of the disc 24, to rupture the disc 24 upon detonation. Upon a collision of the vehicle in which the generating means 20 is disposed, the outlet disc 24 is dislarged with the resultant release of the generated gas. Obviously, release of the gas prior to installation of the gas generating means 20 in a vehicle, such as during storage or transportation, is to be avoided. However, in the event that a malfunction results in dislodgement of the outlet disc 24, the cap assembly 2 provides assurance against the possibility of personal injury and property damage in the vicinity of where the gas generating means 20 is situated. The gas released flows into the interior volume of the cap assembly 2 and out through the apertures 8. Since these apertures 8 are spaced equidistantly around the circumference of member 4, no resultant force vector is formed. Since there is no resultant force there is no movement of the gas generating means 20. The only manifestation of the malfunction therefore is the release of the gas through the apertures 8. As those skilled in the art are aware, the gas employed for inflation of gas bags is non-toxic to humans and thus, no injury to person or property results therefrom.

In the event that the gas generating means 20 is provided with a detonator 26 the outlet plug 24 will undoubtedly break into many small fragments, none of which will be large enough to plug any of the apertures 8. However, in the case where the plug is released as a function of increased pressure, the disc 24 may be released whole. In that case, it would be possible for the disc 24 to plug up one or more of the equidistantly spaced apertures 8. This would result in an unbalanced release of gas with the resultant formation of a force vector and thus cause movement of the gas generating means 20. To prevent such an eventuality, the gas outlet disc holding means 10 is provided. The initial movement of the disc 24 in the event of its dislodgement is straight ahead in the downstream direction. Thus, the holding means 10, which is disposed directly downstream of the disc 24, is provided with a sharp point at its end. The fast moving disc 24 impacts onto the sharp edge of the holding means 10 resulting in the attachment of the disc 24 onto the holding means 10. In this position, the disc 24 is disposed away from any of the apertures and blockage of any of the apertures 8 is avoided.

The cap assembly 2 is especially designed with means for attachment to the outlet of the gas generating means 20. This may be accomplished, as illustrated in FIG. 2, by tapping the inside face of the member 4 to provide an internal thread 25 to mate with a threaded outlet 27 provided on the gas generating means outlet assembly 22.

An additional advantage of the cap assembly 2 of the instant invention is illustrated by the conduit 28 which is shown in communication with the cap assembly. In the preferred embodiment illustrated in FIG. 2, the cap assembly 2 does not need to be removed prior to installation of the gas generating means 20 in the vehicle to be provided with the inflatable gas bag assembly restraint system. Thus, the conduit 28, in communication with a diffuser (not shown), may be disposed about the cap assembly 2 without its removal. This feature of the cap assembly 2 of the instant invention not only saves the time it would normally take to remove the cap but, more importantly, assures that at no time during the period in which the gas generating means 20 is not installed is there any possibility of an inadvertent release of its gas without the protection of the cap assembly 2. It should be appreciated that one of the most dangerous times for gas release would occur during the cap assembly 2 removal.

In the event of collision of the vehicle equipped with gas generating means 20 capped with assembly 2, the outlet disc 24 is removed, and gas stored and/or generated flows into gas generating means 20 and thence into the cap assembly 2. It immediately escapes into conduit 28 through the plurality of apertures 8 to inflate one or more gas bags.

The above-described, preferred embodiment of the cap assembly of the instant invention is meant to be illustrative of the scope and spirit of this invention. Other embodiments which do not depart from the scope and spirit of this invention are within its contemplation. Thus, the instant invention should be limited only by the appended claims.

What is claimed is:

1. A gas supplying vessel provided with a gas supplying means and at an outlet end closed by a plug connected thereto, said plug containing a rupture disc; the improvement comprising: a cap assembly, said cap assembly including a cylindrical member provided with a plurality of apertures equidistantly spaced about the circumferentially shaped surface; and a circular shaped plate connected to said cylindrical member to close one end of said member, said plate provided with a sharp edged pointer mounted on the inside face of said plate, opposite the center of said plug with said rupture disc for impaling said disc and holding it away from said apertures, said cap assembly connected to the outside face of the plug opposite the rupture disc.

2. The improved assembly of claim 1 wherein said cap assembly, including said sharp edged pointer, is constructed of steel.

* * * * *